July 29, 1952     S. S. SHOUP     2,605,148

PRELOADED BEARING CARTRIDGE ASSEMBLY

Filed Nov. 13, 1947

INVENTOR.
Stanley S. Shoup
BY
C. Verne Martin
ATTORNEY

Patented July 29, 1952

2,605,148

UNITED STATES PATENT OFFICE 2,605,148

PRELOADED BEARING CARTRIDGE ASSEMBLY

Stanley S. Shoup, Toledo, Ohio, assignor to The National Supply Company, Pittsburgh, Pa., a corporation of Pennsylvania Application November 13, 1947, Serial No. 785,684

3 Claims. (Cl. 308—207)

1

This invention relates to a preloaded bearing assembly secured within a cartridge and adapted to be mounted upon or removed from a shaft or other supporting member without effecting its preloaded condition.

This type of preloaded bearing construction is of great value for use upon massive crank shafts such as are required for mud pumps for oil field use, locomotive side rods, power presses and like construction where it is extremely essential to preclude any possible radial movement in the bearing.

It is difficult to assemble a bearing upon a massive crank shaft after it has been positioned in a housing and impose upon it a definite amount of preload. It is much more convenient to assemble and definitely preload the bearing while it is out of the housing. The crux of my invention lies in the fact that a bearing may be assembled upon a mandrel of the same diameter as the shaft, given a definite preload and confined within a cartridge and then removed from said mandrel and either assembled upon a crankshaft within a pump housing or the like, or may be set aside and used to ship for replacement of worn-out bearings in existing equipment, while at the same time still retaining its initial preloaded condition.

It is, therefore, the principal object of my invention to provide a self-contained preloaded bearing assembly secured within a cartridge and capable of retaining its initial preloaded condition whether mounted upon a supporting member or merely stored for future assembly upon a shaft or supporting member.

Another object of my invention is to provide a self-contained preloaded bearing assembly secured within a cartridge and adapted to be assembled upon a shaft without effecting its original preloaded condition.

Another object of my invention is to provide a means to initially preload a bearing assembly and maintain it in its required preloaded condition even though it is not immediately assembled upon a shaft.

Another object of my invention is to provide a means to facilitate the mounting of bearing assemblies upon shafts of massive and intricate machines and to retain all the elements from the shaft to the outer member mounted in the bore of the housing or retaining member radially tight.

Further objects and advantages of my invention will become apparent and in part specifically referred to in the description and specification to follow which, taken in conjunction with the accompanying drawings, discloses the preferred form of apparatus in accordance with my invention. It should be understood, however, that the disclosure is illustrative of the principles of my invention in its broader aspects.

2

Figures 1, 2:
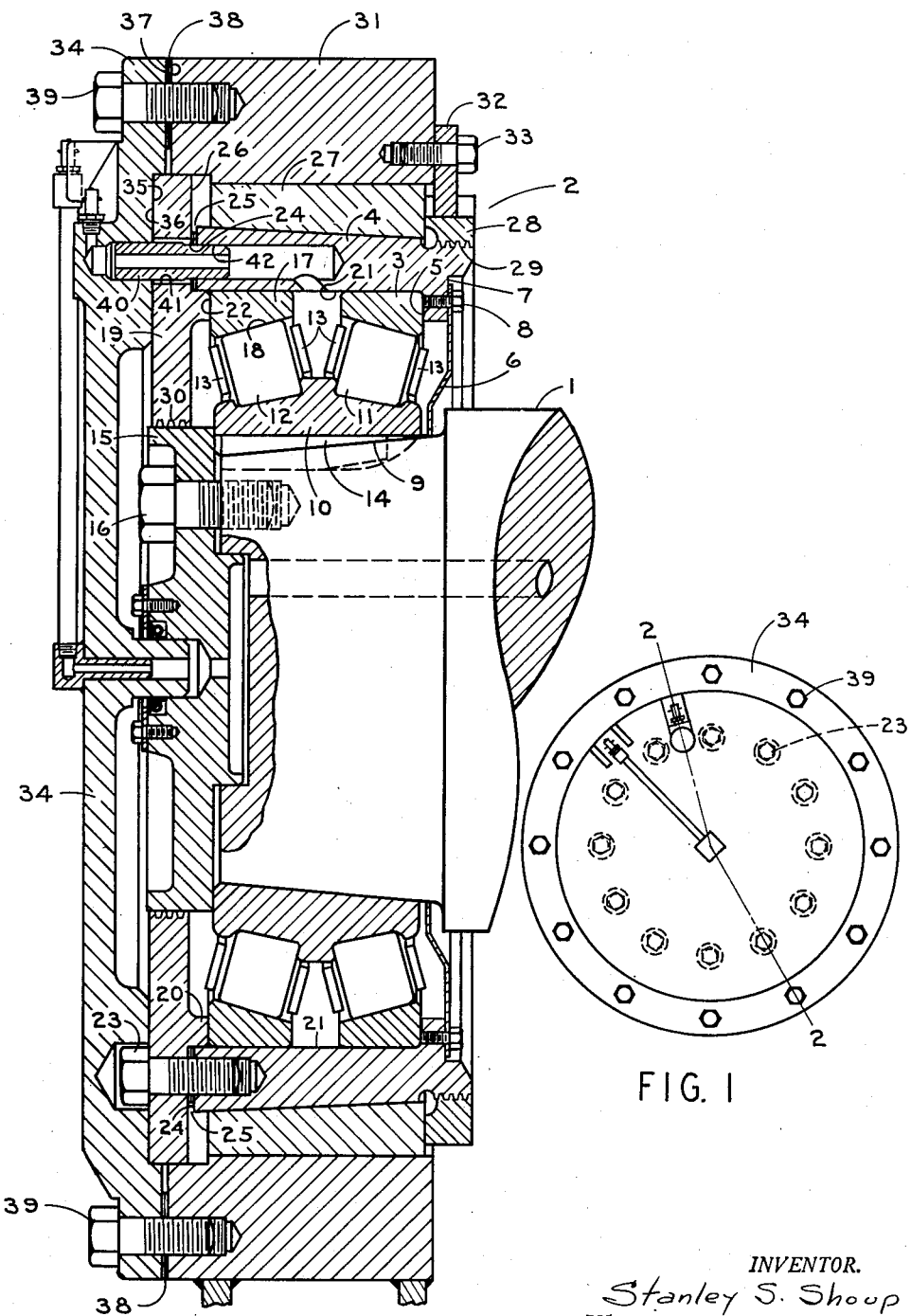
Fig. 1 is an end view of a bearing mounting incorporating my preloaded assembly cartridge.
Figure 2 is an enlarged cross-sectional view of the bearing mounting taken on the line 2—2 of Fig. 1, only a portion of the shaft being shown in section.

In the drawings the numeral 1 represents a crank shaft upon which a preloaded bearing cartridge assembly is to be mounted. The numeral 2 designates the complete cartridge assembly, the constituent parts of which and the procedure used to accomplish this preloaded cartridge will be explained in detail in this specification.

A sub-assembly is first made up by pressing the inner cup 3 into the crankshaft bearing cage 4 until it is securely seated against the shoulder 5. The grease retainer 6 is next secured to a recessed face 7 of the cage 4 by means of a plurality of cap screws 8. This sub-assembly is then placed in position over the tapered bearing portion 9 of the shaft 1 or an assembly mandrel (not shown) simulating the shaft.

The cone 10 of the two-row double cup bearing, including the rollers 11 and 12 and their retaining cages 13 is next mounted on the tapered portion 9 of the shaft 1 or assembly mandrel and secured in its operative position by the key 14. A crankshaft end plate 15 is secured to the end of the shaft 1 or mandrel by a plurality of cap screws 16 to help retain the bearing cone 10 in place. The outer cup 17 is next pressed into place in the cage 4 and seated against the outer tapered surfaces 18 of the rollers 12. A bearing and cage retainer 19, provided with a reduced projecting end portion 20, of such diameter as to slidably enter the bore 21 of the bearing cage 4 is brought to bear snugly against the outer end surface 22 of the outer cup 17 and maintained in this position by a plurality of cap screws 23. In order that the bearing and cage retainer 19 may bear evenly against the outer end surface 22 of the cup and the end face 24 of the cage 4, a plurality of shims 25 are provided to be inserted in the gap between the face 24 of the cage 4 and the surface 26 of the retainer 19. After the proper amount of shims 25 have been determined and inserted to make the bearing snug in the cage, the retainer 19 is removed and the thickness of the shims 25 are carefully measured. If a preload of say .015" is desired, remove shims totaling this amount and reassemble the balance of the shims in the shim gap and replace the retainer 19 and pull it up tight by means of the cap screws 23. Next remove the cap screws 16 and the end plate 15 and pull the assembled preloaded cartridge from the shaft 1 or assembly mandrel. Note that by using the exact thickness of shims to create a predetermined initial preload on the bearing it is impossible to impair the efficiency of the bearing through any wedging action between the rollers and their respective cups and cones.

The preloaded bearing cartridge is now ready for use, either to be assembled on a shaft mounted in a housing or to be held in storage for future use. The initial preload set up at assembly will still be retained.

If the cartridge assembly is to be mounted on a crank shaft in a housing, slide the tapered face of the wedge type slit sleeve 27 over the tapering outside diameter of the bearing cage 4 and temporarily lock in place with a lock nut 28 engaging the threaded portion 29 of the cage 4. Next mount this completed sub-assembly on the shaft 1 and secure in place with the key 14. Replace the end plate 15 and lock in place with the cap screws 16. A running oil seal is provided at 30. Tighten lock nut 28 against the slit sleeve 27 to insure a snug fit of the assembly in the housing 31 and to eliminate any possible radial clearance therebetween. The lock nut 28 should next be secured in place by one or more clamping elements 32 and cap screws 33. Next try on the housing cap 34 which is provided with a recessed surface 35 to bear against the outer face 36 of the retainer 19. Measure the gap between the end of the housing 31 and the face 37 of the cap 34. Provide a suitable number of shims 38 to fill this gap and reassemble the cap, securing the same to the housing by means of a plurality of cap screws 39. Hollow locking pins 40 are located in the cap 34 and register with holes 41 and 42 in the retainer 19 and cage 4 respectively. These pins assist in keeping the preloaded cartridge assembly 2 from rotating in the housing 31 and provide a channel through which lubricant may be conducted to the rollers 11 and 12.

In the particular adaptation of the invention as illustrated in the drawings, rollers 11 and 12 of the frustro-conical type are employed, but obviously, as far as the essential features of the invention are concerned, rollers of other known shapes as well as balls or spheres may be employed as anti-friction elements without departing from the spirit of the invention. Likewise it is immaterial whether the bearing assembly is mounted upon a tapered or straight cylindrical shaft provided the cartridge is maintained radially tight on the shaft.

While my invention has been disclosed as carried out by the apparatus of the above described specific construction, it should be understood that many changes may be made therein without departing from the spirit of the invention in its broader aspects and I do not wish to be limited or restricted to the specific details set forth but wish to reserve to myself any further embodiments, modifications and variations that may appear to those skilled in the art or fall within the scope of the appended claims.

Having fully disclosed my invention, what I claim as new and desire to secure by United States Letters Patent is:

1. A radially tight bearing mounting for a preloaded bearing cartridge mounted upon a shaft and within the bore of a housing comprising relatively rotatable cone and cup members, a plurality of anti-friction rollers interposed between said members to form a bearing unit, a cage encasing and maintaining the elements of said unit in spaced relation, a retainer, shims of a predetermined thickness insertable between said cage and said retainer, preloading means to urge and retain said retainer, shims and cage in metal to metal contact under pressure, said same means simultaneously retaining said retainer in preloaded metal to metal contact with the outermost face of one of said cup members to provide a preloaded bearing cartridge, means to retain said cartridge radially tight on said shaft, a wedge type slit sleeve encasing said cartridge and mounted within the bore of said housing and means to urge said slit sleeve into radially tight contact with said cartridge and the bore of said housing.

2. A radially tight bearing mounting for a preloaded bearing cartridge mounted upon a shaft and within the bore of a housing comprising an anti-friction bearing unit including relatively rotatable cone and cup members and a plurality of rollers interposed between said members, a cage encasing and maintaining the elements of said unit in spaced relation, a retainer contacting the outermost face of one of said cup members, shims of a predetermined thickness interposed between said retainer and said cage, means to retain said retainer, shims and cage in preloaded metal to metal contact, said same means simultaneously retaining said retainer and said outermost face of said cup member in preloaded metal to metal contact to form a preloaded bearing cartridge, means to secure said cartridge radially tight on said shaft, a wedge type slit sleeve encasing said cartridge and mounted within the bore of said housing, means to axially urge said slit sleeve into radially tight contact with said cartridge and bore of said housing and means to lock and retain said urging means in any adjusted position.

3. A radially tight bearing mounting for a self-contained bearing cartridge mounted upon a shaft as a unit and within the bore of a housing comprising, an anti-friction bearing, a cage encasing the elements of said bearing, a retainer abutting against the end surface of one of said elements, means to maintain said bearing, cage and retainer together as a self-contained cartridge, means to retain said cartridge radially tight on said shaft, a wedge type sleeve surrounding said cartridge and mounted within the bore of said housing and means to urge said sleeve into radially tight contact with said cartridge and the bore of said housing.

STANLEY S. SHOUP.

REFERENCES CITED

The following references are of record in the file of this patent:

UNITED STATES PATENTS

| Number | Name | Date |
|---|---|---|
| 1,722,493 | Brunner | July 30, 1929 |
| 1,740,511 | Hicks | Dec. 24, 1929 |
| 1,778,822 | Ackerman | Oct. 21, 1930 |
| 1,895,142 | Wood | May 16, 1933 |
| 1,904,395 | Whitehead | Apr. 18, 1933 |
| 1,908,956 | Chievitz | May 16, 1933 |
| 1,928,114 | Scheffler | Sept. 26, 1933 |
| 2,037,242 | Kutter | Apr. 14, 1936 |
| 2,065,311 | Hoke | Dec. 22, 1936 |
| 2,314,622 | Klamp | Mar. 23, 1943 |